United States Patent
Aoyama

(10) Patent No.: US 7,719,789 B2
(45) Date of Patent: May 18, 2010

(54) CONTROLLING DEVICE, MAGNETIC STORAGE MEDIUM, STORAGE DEVICE, AND METHOD FOR DETERMINING OFFSET AMOUNT

(75) Inventor: Nobuhide Aoyama, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/350,592

(22) Filed: Jan. 8, 2009

(65) Prior Publication Data

US 2009/0290254 A1 Nov. 26, 2009

(30) Foreign Application Priority Data

May 23, 2008 (JP) ............................ 2008-135742

(51) Int. Cl.
*G11B 5/596* (2006.01)
(52) U.S. Cl. .................................... 360/77.08; 360/135
(58) Field of Classification Search ....................... None
See application file for complete search history.

(56) References Cited

U.S. PATENT DOCUMENTS

| | | | | |
|---|---|---|---|---|
| 4,157,577 A | * | 6/1979 | Porter et al. ............. | 360/77.07 |
| 4,454,549 A | * | 6/1984 | Pennington ............... | 360/77.08 |
| 6,091,564 A | * | 7/2000 | Codilian et al. .......... | 360/77.08 |
| 7,298,579 B2 | * | 11/2007 | Asakura et al. .......... | 360/77.08 |
| 7,388,729 B2 | * | 6/2008 | Nakamura ............... | 360/77.08 |
| 7,502,197 B1 | * | 3/2009 | Chue ....................... | 360/77.08 |
| 2006/0061900 A1 | * | 3/2006 | Ohtsuka et al. ............ | 360/69 |

FOREIGN PATENT DOCUMENTS

JP A 9-45025 2/1997

* cited by examiner

*Primary Examiner*—William J Klimowicz
*Assistant Examiner*—James L Habermehl
(74) *Attorney, Agent, or Firm*—Greer, Burns & Crain, Ltd.

(57) ABSTRACT

A magnetic storage medium has tracks and guard bands magnetically separating adjacent tracks. The tracks and the guard bands are alternately and concentrically disposed. The tracks includes a plurality of data tracks in which data can be written and from which data can be reproduced and servo patterns disposed between the data tracks and allowing reproduction of positional information of the data tracks. The magnetic storage medium includes an offset-amount measurement area in which traverse tracks are formed so as to traverse adjacent tracks via each of the guard bands so that writing regarding offset measurement data for measuring an offset amount between a storage element and a reproducing element of a magnetic head unit is allowed at a center position of the storage element.

12 Claims, 13 Drawing Sheets

TRACK DIRECTION

CONTROLLING DEVICE, MAGNETIC STORAGE MEDIUM, STORAGE DEVICE, AND METHOD FOR DETERMINING OFFSET AMOUNT

CROSS-REFERENCE TO RELATED APPLICATION(S)

This application is based upon and claims the benefit of priority of the prior Japanese Patent Application No. 2008-135742, filed on May 23, 2008, the entire contents of which are incorporated herein by reference.

FIELD

The embodiments discussed herein are directed to a controlling device, a storage device, a magnetic storage medium, and a method for determining an offset amount between a storage element and a reproducing element of a magnetic head unit which writes and reproduces data into and from a magnetic storage medium.

BACKGROUND

A hard disk is a storage device employed in personal computers, hard disk drive (hereinafter simply HDD) recorders, and the like. Storage density of the hard disk is increasing year after year.

To realize further improvement in storage density, the recording system is switched from longitudinal recording to vertical magnetic recording in recent years.

In addition, for the further improvement in storage density, research and development on various media, such as Discrete Track Media (DTMs) and Bit Patterned Media (BPMs) have been actively conducted.

FIG. 14 is a schematic plan view of an arrangement of data tracks and servo patterns in a general DTM. FIG. 15 is a schematic partial cutaway view illustrating a positional relation of tracks and guard bands in a general DTM.

A DTM 200 depicted in FIG. 14 has tracks 203 and guard bands 204 magnetically separating adjacent tracks 203. The tracks 203 and the guard bands 204 are alternately and concentrically disposed. The tracks 203 include a plurality of data tracks 201 and servo patterns 202. Data can be written into the data track 201 and reproduced therefrom. The servo pattern 202 is disposed between the data tracks 201 to allow reproduction of positional information of the data track 201.

In the DTM 200 depicted in FIG. 15, the guard bands 204 each magnetically separating adjacent tracks 203 are disposed to suppress side erase of the adjacent track 203 corresponding to the guard band 204, thereby achieving an improved storage density by physical shape of grooves.

FIG. 16 is a schematic partial cutaway view illustrating an arrangement of tracks and a guard band in a general BPM.

A BPM 210 depicted in FIG. 16 is configured to have discontinuous data tracks 212 not only magnetically separating adjacent tracks 211 in a track direction but also magnetically separating them in a down track direction, that is, in a bit longitudinal direction, thereby improving not only tracking density but also bit density.

The conventional HDD device includes a magnetic head unit provided with a storage element and a reproducing element. The storage element writes data in a data track of a mounted magnetic storage medium, and the reproducing element reproduces data written in the data track. A distance between the storage element and the reproducing element is several tens of micrometers.

In the conventional HDD device, the mounted magnetic storage medium is formed of a magnetic recording layer of continuous film. Thus, after the storage element writes offset measurement data into the magnetic storage medium, the magnetic head unit is moved in a track direction to make the reproducing element reproduce and output the data. An amount (distance) shifted from a write position where the offset measurement data is written to a reproduction position at which the reproduction output is at maximum is determined as an offset amount between the reproducing element and the storage element.

Therefore, the reproducing element and the storage element can be smoothly positioned with respect to the data tracks based on the offset amount between the reproducing element and the storage element in the conventional HDD device (for example, refer to Japanese Laid-open Patent Publication No. 09-45025).

According to the conventional HDD device, in a magnetic recording medium including a magnetic recording layer of continuous film, after offset measurement data is written in a data track, the magnetic head unit is moved in a track direction to reproduce and output data through the reproducing element, and then a distance from a write position where the offset measurement data is written to a reproduction position at which the reproduction output is at maximum is determined as an offset amount between the reproducing element and the storage element. However, in a magnetic recording medium, such as a DTM or BPM, the track position of the data tracks is fixed, and guard bands are present between adjacent tracks. Therefore, the offset measurement data is required to be reliably written at the center of the data track.

Therefore, according to the conventional HDD device, it is difficult to determine an offset amount between the storage element and the reproducing element of the magnetic head unit for the magnetic storage medium with a guard band between adjacent tracks, such as a DTM or BPM.

SUMMARY

According to an aspect of the invention, a controlling device for a storage device includes: a rotation-drive controlling unit that drives a magnetic storage medium for rotation, the magnetic storage medium including tracks and guard bands magnetically separating adjacent tracks alternately and concentrically disposed, the tracks including a plurality of data tracks in which data can be written and from which data can be reproduced and servo patterns disposed between the data tracks and allowing reproduction of positional information of the data tracks, the magnetic storage medium including an offset-amount measurement area in which traverse tracks are formed so as to traverse adjacent tracks via each of the guard bands so that writing regarding offset measurement data for measuring an offset amount between a storage element and a reproducing element of a magnetic head unit is allowed at a center position of the storage element; a magnetic-head-drive controlling unit that controls a movement of the magnetic head unit in a track direction with respect to the magnetic storage medium; a write controlling unit that writes, when an offset-amount measurement start signal is detected, the offset measurement data in a part of a relevant one of the traverse tracks in the offset-amount measurement area through the storage element, and also stores a write position of the storage element in the track direction; a reproduction controlling unit that sequentially positions, when the offset measurement data is written in the part of the traverse track in the offset-amount measurement area, a center position of the reproducing element of the magnetic head unit at a reproduction position in a reproducible range regarding the write position through the magnetic-head-drive controlling unit for each predetermined distance to produce a reproduction output; and an offset-amount determining unit that specifies, from among peak values of the reproduction output for each reproduction position, a reproduction position corresponding to a maximum peak value as a reproduction position of the reproducing element and, based on the write position of the storage element and the reproduction position of the reproducing element, determines an offset amount as a moved distance between the storage element and the reproducing element.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

DESCRIPTION OF EMBODIMENT(S)

Embodiments of a control device for a storage device, magnetic storage medium, storage device, and offset-amount determining method for the storage device are explained in detail below based on the drawings.

[a] First Embodiment

Figure 1:
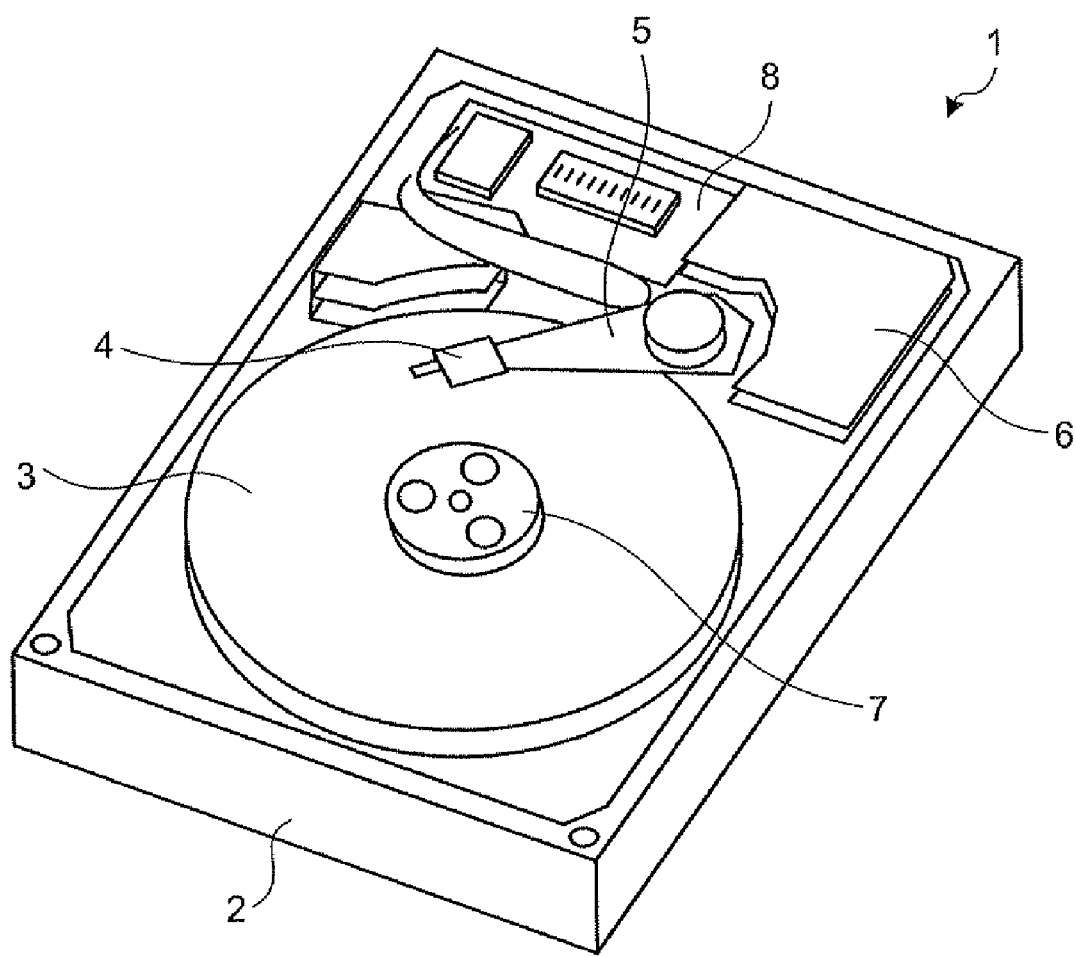
FIG. 1 is a perspective view of a schematic configuration of an HDD device according to a first embodiment.
Figure 2:
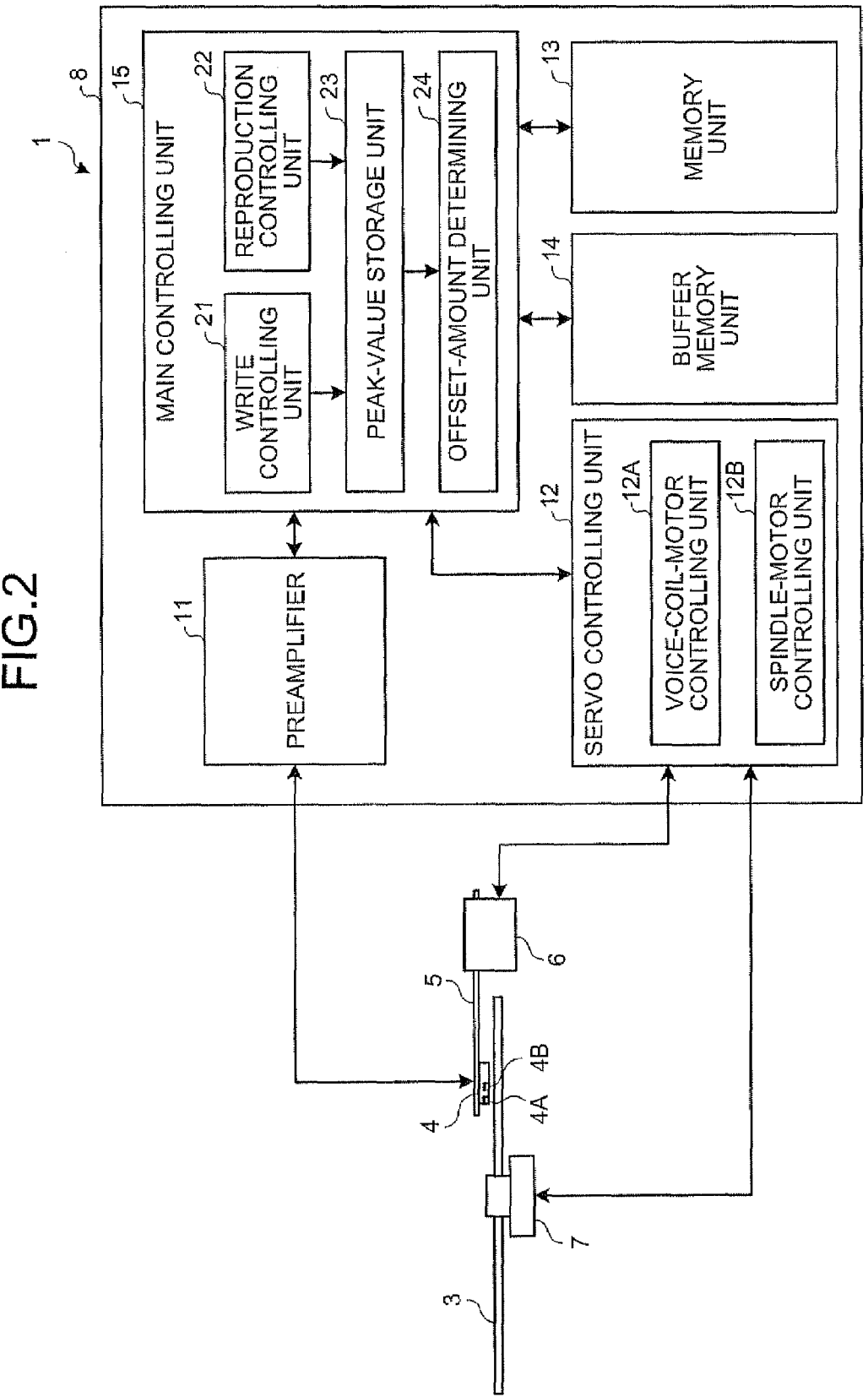
FIG. 2 is a schematic block diagram of the HDD device according to the first embodiment.
Figure 3:
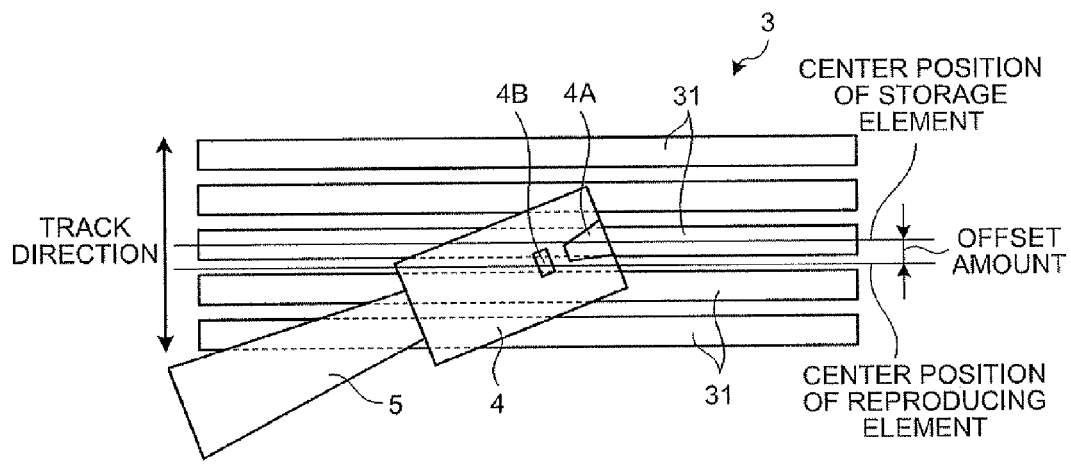
FIG. 3 is a schematic drawing for explaining a positional relation between a storage element and a reproducing element of a magnetic head unit of the HDD device according to the first embodiment.

FIG. 1 is a schematic perspective view of a configuration of an HDD device according to a first embodiment. FIG. 2 is a schematic block diagram of the HDD device according to the first embodiment. FIG. 3 is a schematic drawing for explaining a positional relation between a storage element and a reproducing element of a magnetic head unit of the HDD device according to the first embodiment.

An HDD device 1 depicted in FIG. 1 has a DTM 3 mounted on a base body 2, and writes data in the DTM 3 and reproduces data written in the DTM 3.

The HDD device 1 includes a magnetic head unit 4 that writes and reproduces data into and from a track on the mounted DTM 3 and a suspension member 5 that suspends the magnetic head unit 4 in a track direction of the DTM 3.

Further, the HDD device 1 includes a voice coil motor 6 that moves the magnetic head unit 4 in the track direction of the DTM 3 through the suspension member 5, a spindle motor 7 that drives the DTM 3 for rotation at a predetermined rotating speed, and a control circuit 8 that controls the entire HDD device 1.

As depicted in FIGS. 2 and 3, the magnetic head unit 4 includes a storage element 4A mainly made of FeCo as a magnetic-pole material with a highly-saturated magnetic flux density for writing data in a data track in the tracks on the DTM 3 and a reproducing element 4B with Tunneling Magneto Resistivity (TMR) for reproducing data from a data track and a servo pattern in the tracks.

The control circuit 8 includes a preamplifier 11 that performs signal processing when data is written in the DTM 3 or written data is reproduced therefrom through the magnetic head unit 4, a servo controlling unit 12 that controls the driving of the voice coil motor 6 and the spindle motor 7, a memory unit 13 that has various information stored therein, a buffer memory unit 14 that has various information temporarily stored therein, and a main controlling unit 15 that controls the entire control circuit 8.

The servo controlling unit 12 includes a voice-coil-motor controlling unit 12A that controls the driving of the voice coil motor 6 and a spindle-motor controlling unit 12B that controls the driving of the spindle motor 7.

Furthermore, the main controlling unit 15 includes a write controlling unit 21 and a reproduction controlling unit 22. Upon detecting an offset-amount measurement start signal indicative of the start of measuring an offset amount, the write controlling unit 21 writes offset measurement data in a data track 31 in the DTM 3 through the storage element 4A and stores a write position of the storage element 4A in the track direction. When the offset measurement data is written, the reproduction controlling unit 22 sequentially positions the center position of the reproducing element 4B of the magnetic head unit 4 at each reproduction position within a reproducible range of the data track 31 through the voice-coil-motor controlling unit 12A and reproduces and outputs data through the preamplifier 11 for each reproduction position.

The write controlling unit 21 shifts the write position of the storage element 4A through the voice-coil-motor controlling unit 12A by a predetermined distance, thereby writing offset measurement data through the storage element 4A.

The reproduction controlling unit 22 shifts the reproduction position of the reproducing element 4B through the voice-coil-motor controlling unit 12A by a predetermined distance, for example, 3 nanometers, for each write position, thereby reproducing and outputting the offset measurement data through the reproducing element 4B.

The main controlling unit 15 includes a peak-value storage unit 23 that sequentially updates a peak value of the reproduction output (Track Average Amplitude: hereinafter, "TAA") obtained by the reproduction controlling unit 22 for each reproduction position.

Further, the main controlling unit 15 includes an offset-amount determining unit 24 that specifies a reproduction position corresponding to a maximum peak value of the reproduction output from among peak values of the respective reproduction positions stored in the peak-value storage unit 23 as a final reproduction position of the reproducing element 4B and determines an offset amount as a distance between the storage element 4A and the reproducing element 4B based on the write position of the storage element 4A and the reproduction position of the reproducing element 4B.

Figure 4:
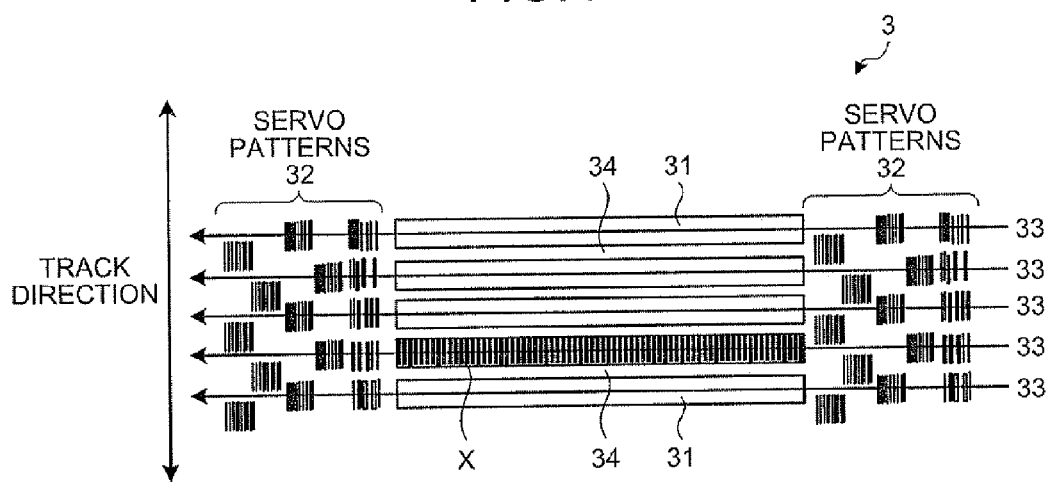
FIG. 4 is a schematic drawing for explaining a track arrangement in a DTM mounted on the HDD device according to the first embodiment.

FIG. 4 is a schematic drawing for explaining a track arrangement in the DTM 3 mounted on the HDD device 1 according to the first embodiment.

The DTM 3 has tracks 33 and guard bands 34 magnetically separating adjacent tracks 33 alternately and concentrically disposed. The tracks 33 include a plurality of data tracks 31, in which data can be written and from which data can be reproduced, and servo patterns 32 disposed between the data tracks 31 to allow positional information of the data tracks 31 to be reproduced.

The main controlling unit 15 reproduces the servo patterns 32 on the tracks 33 through the reproducing element 4B of the magnetic head unit 4 and, based on the reproduced servo patterns 32, controls the driving of the magnetic head unit 4 through the voice-coil-motor controlling unit 12A of the servo controlling unit 12.

Figure 5A:
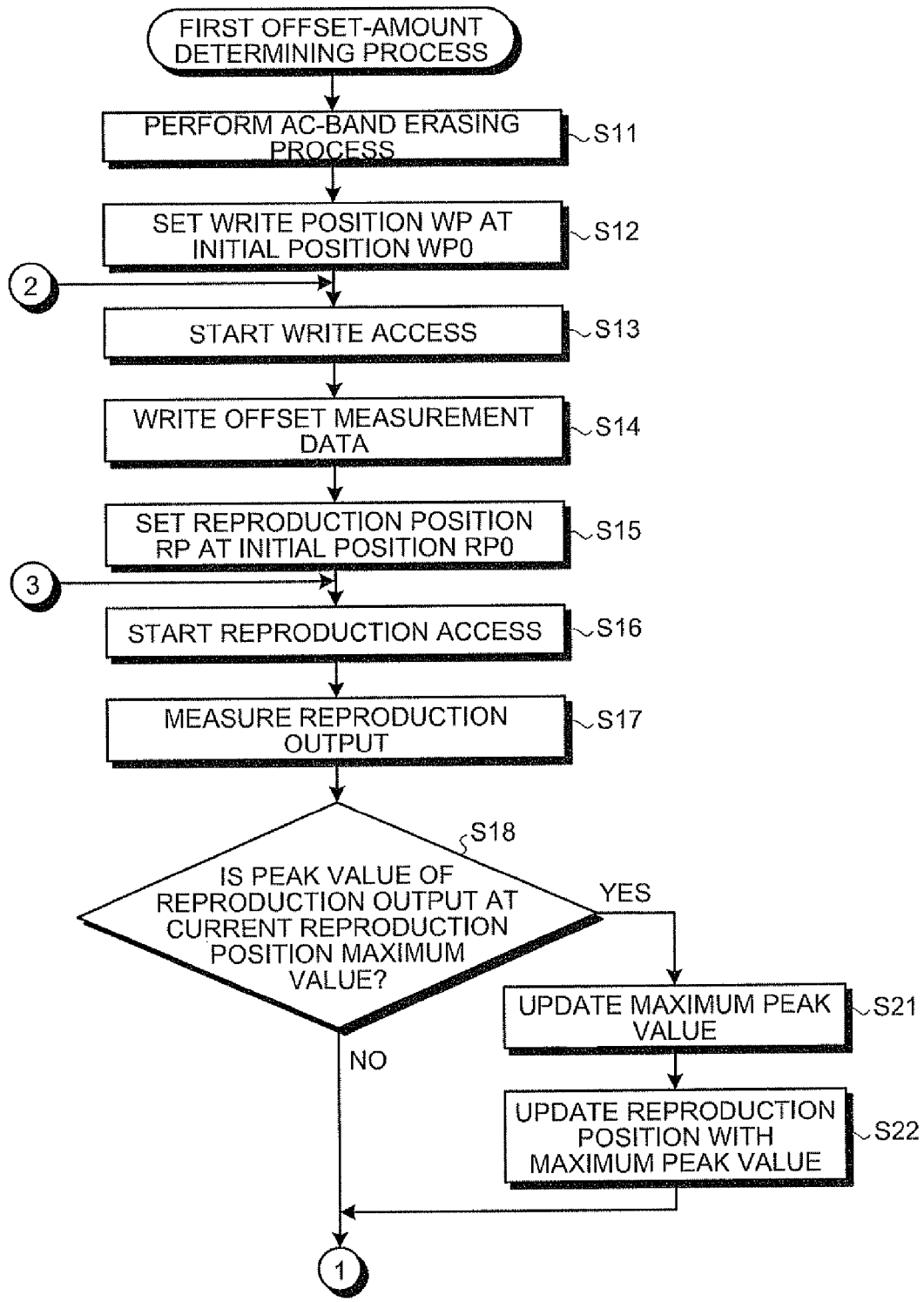
FIGS. 5A and 5B are flowcharts of an operation of a control circuit involved in a first offset-amount determining process of the HDD device according to the first embodiment.
Figure 5B:
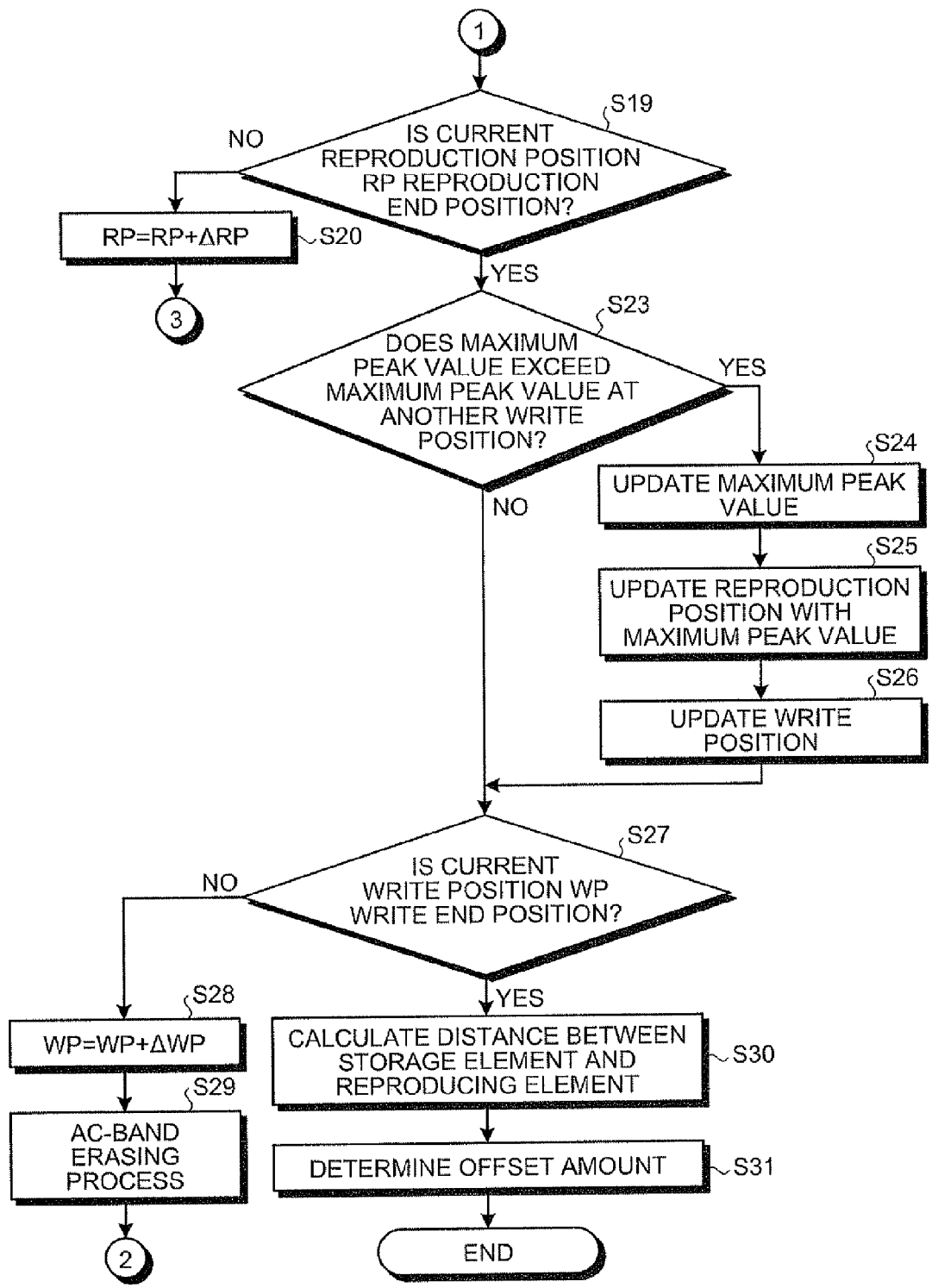

Next, the operation of the HDD device 1 according to the first embodiment is explained. FIGS. 5A and 5B are flowcharts of an operation of the control circuit 8 involved in a first offset-amount determining process of the HDD device 1 according to the first embodiment.

The first offset-amount determining process depicted in FIGS. 5A and 5B is a process for determining an offset amount between the storage element 4A and the reproducing element 4B of the magnetic head unit 4 that performs a write access and a reproduction access onto the DTM 3.

In FIG. 5A, when an offset-amount measurement start signal is detected, the write controlling unit 21 inside the main controlling unit 15 performs an AC-band erasing process for magnetically erasing data on the data track 31 in which offset measurement data is to be written, on the order of ±3 micrometers in a cross-track direction at a high frequency on the order of 1 GFluxChange/sec through the storage element 4A (step S11).

The write controlling unit 21 then sets a write position WP at an initial position WP0 so as to write the offset measurement data through the storage element 4A (step S12), and then starts a write access by the storage element 4A (step S13).

Upon starting the write access, the write controlling unit 21 writes offset measurement data X of a single frequency signal of 90 FluxChange/sec in the data track 31 at the currently-set write position WP through the storage element 4A, as depicted in FIG. 4 (step S14).

The reproduction controlling unit 22 in the main controlling unit 15 sets a reproduction position RP in the track direction at an initial position RP0 so as to reproduce the offset measurement data written in the data track 31 through the reproducing element 4B (step S15) starts a reproduction access of the reproducing element 4B (step S16), and then measures a reproduction output at the current reproduction position RP through the reproducing element 4B (step S17).

The reproduction controlling unit 22 determines whether a peak value of the reproduction output at the current reproduction position RP is a maximum peak value (step S18).

When the peak value of the reproduction output at the current reproduction position RP is not a maximum peak value ("No" at step S18), the reproduction controlling unit 22 determines whether the current reproduction position RP is a reproduction end position (step S19). Note that the reproduction end position is a position immediately before leaving the reproducible range regarding the write position WP.

If the current reproduction position RP is not the reproduction end position ("No" at step S19), the reproduction controlling unit 22 further shifts the current reproduction position RP by $\Delta RP$ ($\Delta RP=3$ nanometers) and sets $RP+\Delta RP$ as a current reproduction position (step S20), and then goes to step S16 to start a reproduction access through the reproducing element 4B.

When the peak value of the TAA at the current reproduction position RP is a maximum peak value ("Yes" at step S18), the reproduction controlling unit 22 updates and stores the peak value at the current reproduction position RP in the peak-value storage unit 23 as a maximum peak value at the current write position WP (step S21).

Further, when the peak value at the current reproduction position RP is updated and stored in the peak-value storage unit 23 as a maximum peak value, the reproduction controlling unit 22 updates and stores the reproduction position as a reproduction position with the maximum peak value RPMAX at the current write position WP (step S22), and then goes to step S19 so as to determine whether the current reproduction position RP is the reproduction end position.

That is, the reproduction output of the offset measurement data X written at the current write position WP is produced for each $\Delta RP$ from the initial position RP0 to the reproduction end position by shifting the reproducing element 4B, thereby obtaining the reproduction position with the maximum peak value RPMAX from the offset measurement data X written at the current write position WP.

Then, if the current reproduction position RP is the reproduction end position ("Yes" at step S19), the reproduction controlling unit 22 determines whether the maximum peak value at the current write position WP exceeds a maximum peak value at another write position WP (step S23).

When the maximum peak value at the current write position WP exceeds a maximum peak value at another write position WP ("Yes" at step S23), the reproduction controlling unit 22 updates and stores the maximum peak value at the current write position WP as a maximum peak value (step S24), and then updates and stores the reproduction position with the maximum peak value RPMAX for the current write position WP (step S25).

The reproduction controlling unit 22 updates and stores the current write position WP as a write position with the maximum peak value WPMAX (step S26), and then determines whether the current write position WP is a write end position (step S27). Note that the write end position is a position immediately before leaving a writable range of the offset measurement data X.

If the current write position WP is not the write end position ("No" at step S27), the reproduction controlling unit 22 shifts the current write position WP by ΔWP so as to write the offset measurement data X again and sets WP+ΔWP as a current write position WP (step S28).

When WP+ΔWP is set as a current write position WP, the write controlling unit 21 performs an AC-band erasing process for magnetically erasing data on the data track 31 in which the offset measurement data is to be written, on the order of ±3 micrometers in the cross-track direction at a high frequency on the order of 1 GFluxChange/sec through the storage element 4A (step S29), and then goes to step S13 so as to start a write access to the current write position WP through the storage element 4A.

Figure 6:
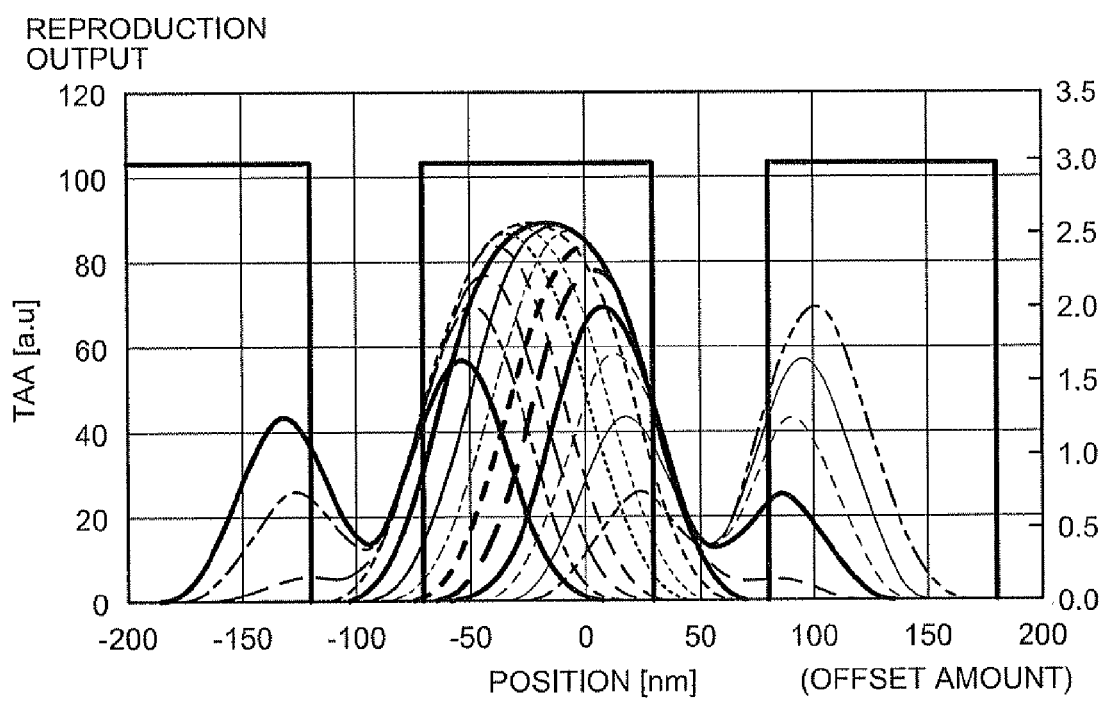
FIG. 6 is a schematic drawing for explaining a reproduction position (offset amount) and a reproduction output (Track Average Amplitude: TAA) of a reproducing element in the first offset-amount determining process of the HDD device according to the first embodiment.

That is, writing is sequentially performed for each ΔWP from the initial position WP0 of the write position WP to the write end position, thereby obtaining a maximum peak value of the reproduction output for each write position WP, as depicted in FIG. 6. Note that "0" on the horizontal axis depicted in FIG. 6 corresponds to the write position WP.

On the other hand, when the maximum peak value at the current write position WP does not exceed a maximum peak value at another write position WP ("No" at step S23), the write controlling unit 21 goes to step S27 so as to determine whether the current write position WP is the write end position.

If the current write position WP is the write end position ("Yes" at step S27), the offset-amount determining unit 24 in the main controlling unit 15 calculates a distance between the storage element 4A and the reproducing element 4B based on the reproduction position RPMAX set at step S25 and the write position WPMAX set at step S26 corresponding to maximum peak values stored in the peak-value storage unit 23 (step S30), and determines the calculated distance as an offset amount between the storage element 4A and the reproducing element 4B (step S31) thereby ending the operation of FIGS. 5A and 5B.

In the first offset-amount determining process depicted in FIGS. 5A and 5B, from among a plurality of reproduction positions RP of the plurality of write positions WP, the reproduction position RPMAX where the peak value of reproduction output is at the maximum and the write position WPMAX corresponding to the reproduction position with the maximum peak value RPMAX are specified. Based on these specified reproduction position RPMAX and write position WPMAX, a distance between the storage element 4A and the reproducing element 4B is calculated. The calculated distance is determined as an offset amount between the storage element 4A and the reproducing element 4B. Therefore, even in the DTM 3 in which the guard band 34 is disposed between adjacent tracks 31, the offset amount between the storage element 4A and the reproducing element 4B can be determined.

According to the HDD device 1 of the first embodiment, from among a plurality of reproduction positions RP of the plurality of write positions WP, the reproduction position RPMAX where the peak value of the reproduction output is at the maximum and the write position WPMAX corresponding to the reproduction position with the maximum peak value RPMAX are specified. Based on the specified reproduction position RPMAX and write position WPMAX, a distance between the storage element 4A and the reproducing element 4B is calculated. The calculated distance is determined as an offset amount between the storage element 4A and the reproducing element 4B. Therefore, even in the DTM 3 in which the guard band 34 is disposed between adjacent tracks 33, the offset amount between the storage element 4A and the reproducing element 4B can be determined.

According to the HDD device 1 of the first embodiment, since the write position WP of the offset measurement data X may be on any guard band 34 where the offset measurement data X cannot be written, the write position WP is sequentially shifted, and the reproduction position RP is also sequentially shifted for each write position WP. From among these reproduction positions RP of the write positions WP, the reproduction position RPMAX with the maximum peak value and the write position WPMAX corresponding to the reproduction position RPMAX with the maximum peak value are specified. Based on the specified reproduction position RPMAX and write position WPMAX, an offset amount between the storage element 4A and the reproducing element 4B is determined.

However, according to the HDD device 1 of the first embodiment, it is required to sequentially shift the write position WP so as to confirm that the write position WP of the offset measurement data X is not on any guard band 34, and also to shift the reproduction position RP for each write position WP to sequentially measure the reproduction output, requiring some time for that process.

[b] Second Embodiment

Figure 7:
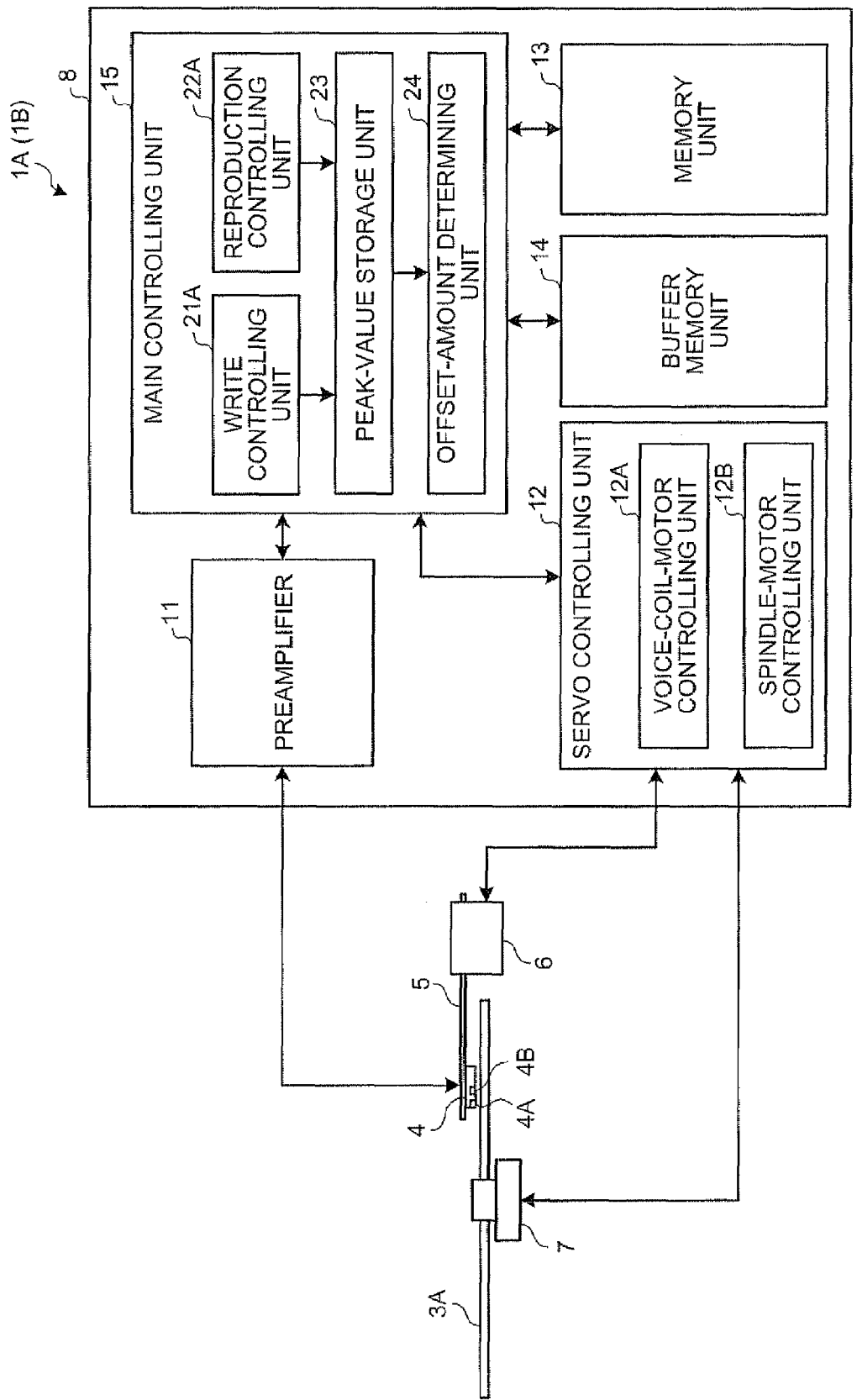
FIG. 7 is a schematic block diagram of an HDD device according to a second embodiment.
Figure 8:
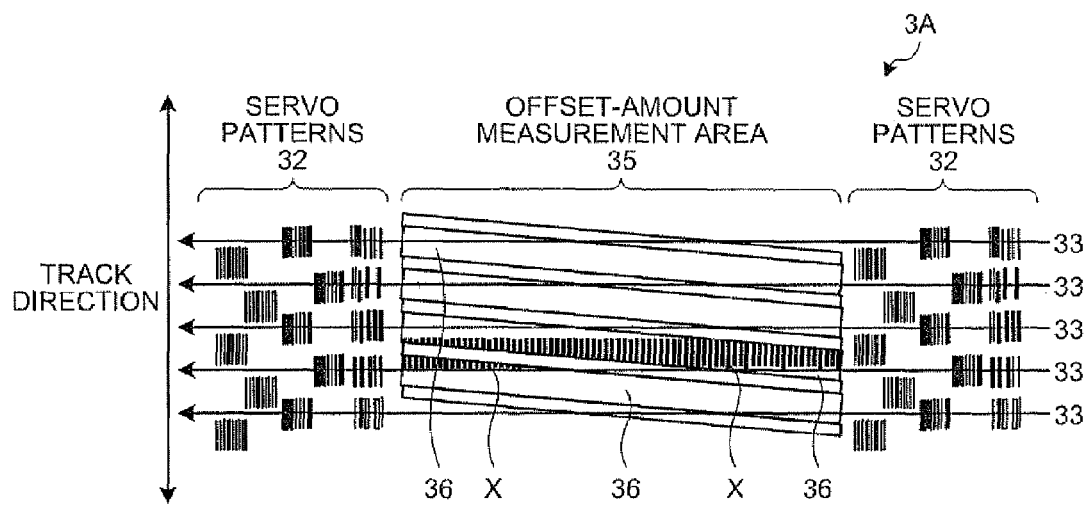
FIG. 8 is a schematic drawing for explaining a track arrangement in an offset amount measurement area of a DTM mounted on the HDD device according to the second embodiment.

To get around this situation, an HDD device according to a second embodiment as explained below is suggested. FIG. 7 is a schematic block diagram of an HDD device according to the second embodiment. FIG. 8 is a schematic drawing for explaining a track arrangement of the HDD device according to the second embodiment. Note that components identical to those in the HDD device 1 according to the first embodiment are denoted by the same reference numerals, and the common configurations and operations are not explained herein.

An HDD device 1A according to the second embodiment is different from the HDD device 1 according to the first embodiment in that, as depicted in FIG. 8, an offset-amount measurement area 35 for use in measuring an offset amount between the storage element 4A and the reproducing element 4B is disposed in a partial area of a DTM 3A. When an offset amount is measured, to ensure writing of the offset measurement data X at the center position of the storage element 4A and reproduction of the offset measurement data X at the center position of the reproducing element 4B in the offset-amount measurement area 35, a plurality of traverse tracks 36 traversing the adjacent tracks 33 in a slanting direction and allowing writing and reproduction of the offset measurement data X are disposed in the offset-amount measurement area 35.

Upon detecting an offset-amount measurement start signal, a write controlling unit 21A in the main controlling unit 15 writes offset measurement data in the offset-amount measurement area 35 through the storage element 4A and stores the write position WP of the storage element 4A in a track direction.

When the offset measurement data is written in the offset-amount measurement area 35, a reproduction controlling unit 22A in the main controlling unit 15 produces a reproduction output, with the center position of the reproducing element 4B of the magnetic head unit 4 being sequentially positioned at the reproduction position RP by ΔRP (ΔRP=3 nanometers) in the reproducible range regarding the write position.

Figure 9:
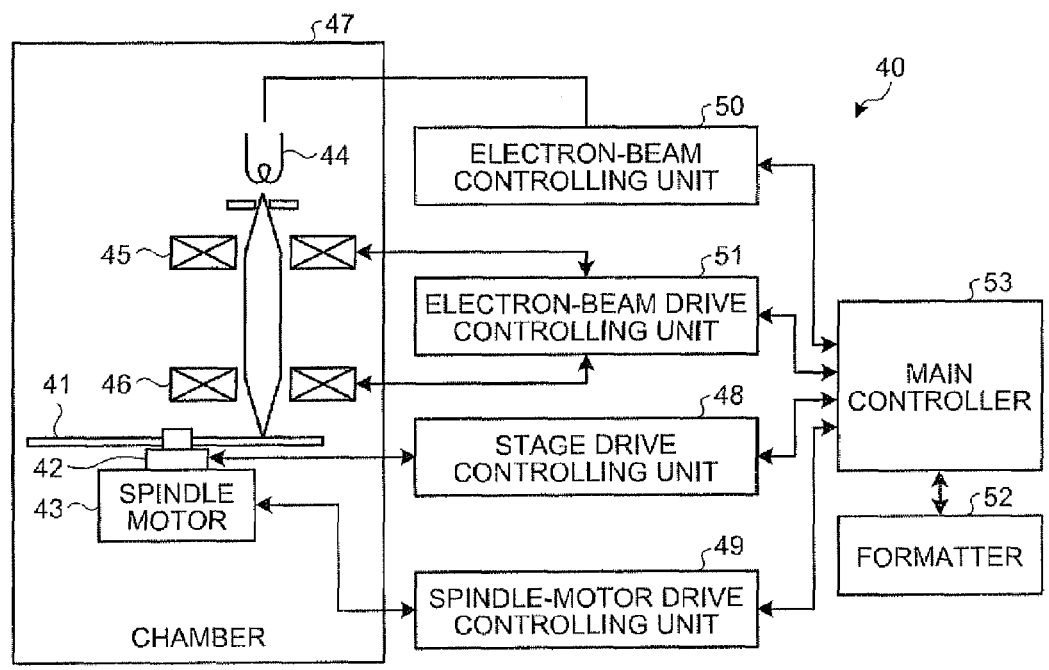
FIG. 9 is a schematic block diagram of an electron-beam exposing device that performs an electron-beam exposing process of the DTM mounted on the HDD device according to the second embodiment.

FIG. 9 is a schematic block diagram of an electron-beam exposing device that performs an electron-beam exposing process of the DTM 3A mounted on the HDD device 1A according to the second embodiment.

An electron-beam exposing device 40 depicted in FIG. 9 includes an X-Y stage 42 that moves in a horizontal and vertical direction (XY direction) on a DTM disk 41, a spindle motor 43 that drives the DTM disk 41 on the X-Y stage 42 for rotation at a predetermined rotating speed, an electron-beam source 44 that outputs an electron beam, an electron-beam adjusting system 45 that adjusts the electron beam from the electron-beam source 44 in the track direction, and an electron-beam converging system 46 that adjusts the electron beam from the electron-beam source 44 in a focusing direction.

Note that the X-Y stage 42, the spindle motor 43, the electron-beam source 44, the electron-beam adjusting system 45, and the electron-beam converging system 46 are disposed in a vacuum chamber 47 at a pressure of $10^{-4}$ pascals.

The electron-beam exposing device 40 also includes a stage drive controlling unit 48 that controls the driving of the X-Y stage 42, a spindle-motor drive controlling unit 49 that controls the driving of the spindle motor 43, an electron-beam controlling unit 50 that controls the driving of the electron-beam source 44, and an electron-beam drive controlling unit 51 that controls the driving of the electron-beam adjusting system 45 and the electron-beam converging system 46.

The electron-beam exposing device 40 includes a formatter 52 that formats the disk 41 and a main controller 53 that controls the entire electron-beam exposing device 40.

Figure 10:
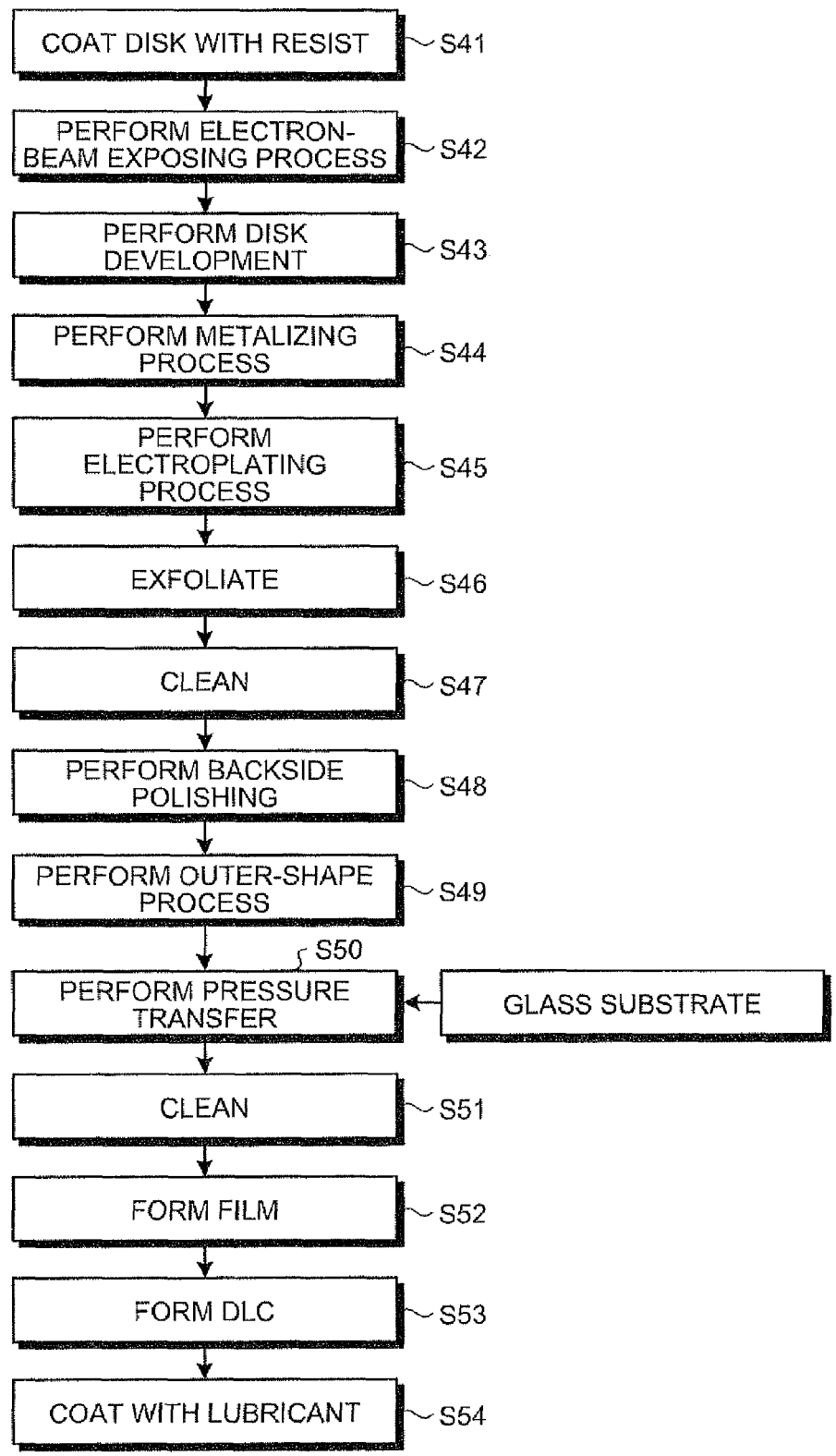
FIG. 10 is a flowchart of a DTM manufacturing process according to the second embodiment.

FIG. 10 is a flowchart of a DTM manufacturing process according to the second embodiment.

In FIG. 10, in a DTM manufacturing apparatus, a surface of the glass disk 41 precisely polished is coated with a resist with a thickness of 5 to 10 nanometers (step S41). Then, through electron-beam exposure by the electron-beam exposing device 40, the data tracks 31, the servo patterns 32, and the traverse tracks 36 are formed on the disk 41 (step S42).

Here, the main controller 53 of the electron-beam exposing device 40 rotates the disk 41 by the spindle motor 43 based on information from the formatter 52 to cause electron beams to converge on the disk 41, and also moves the X-Y stage 42 to form the data tracks 31 and the servo patterns 32 on the disk 41.

Furthermore, the electron-beam exposing device 40 sweeps with an electron beam to form the traverse tracks 36 traversing adjacent tracks 33 in a partial area on the disk 41. Here, in one electron-beam sweeping method, an electron beam may be adjusted by the electron-beam converging system 46 in the track direction. Alternatively, for example, with an electron beam being output fixedly, the X-Y stage 42 on which the disk 41 is mounted may be driven for electron-beam sweeping.

Further, the DTM manufacturing apparatus performs a disk development on the disk 41 subjected to the electron-beam exposing process (step S43) and, after the disk development, performs a metalizing process of forming an AL film through sputtering (step S44). Then, the DTM manufacturing apparatus performs an electroplating process of forming a Ni layer on the order of approximately 150 micrometers on the disk 41 (step S45).

Next, the DTM manufacturing apparatus exfoliates Ni from the disk 41 (step S46), and performs a disk cleaning process for removing the resist (step S47). Furthermore, the DTM manufacturing apparatus polishes the backside of the disk 41 through tape polishing (step S48), and then performs an outer-shape process through mold punching (step S49).

The DTM manufacturing apparatus then forms the data tracks 31, the servo patterns 32, and the traverse tracks 36 on the glass substrate on the disk 41 through pressure transfer (step S50). Furthermore, the DTM manufacturing apparatus cleans the glass substrate on which the data tracks 31, the servo patterns 32, and the traverse tracks 36 have been pressure-transferred (step S51). On the glass substrate, a film having a vertical magnetic recording layer is then formed through sputtering (step S52).

Still further, the DTM manufacturing apparatus forms Diamond Like Carbon (DLC) on the vertical magnetic recording layer through Chemical Vapor Deposition (CVD) (step S53).

The DTM manufacturing apparatus then forms a lubricating layer by coating the DLC with a lubricant (step S54), thereby forming the DTM 3A with the traverse tracks 36, the data tracks 31, and the servo patterns 32 formed therein. Note in the DTM 3A that, for example, the data tracks 31 have a land width of approximately 100 nanometers, the guard band 34 has a groove width of approximately 50 nanometers, a track pitch is approximately 150 nanometers, the guard band 34 has a groove depth of approximately 7 nanometers, and its groove has a taper angle of approximately 70 degrees.

Figure 11:
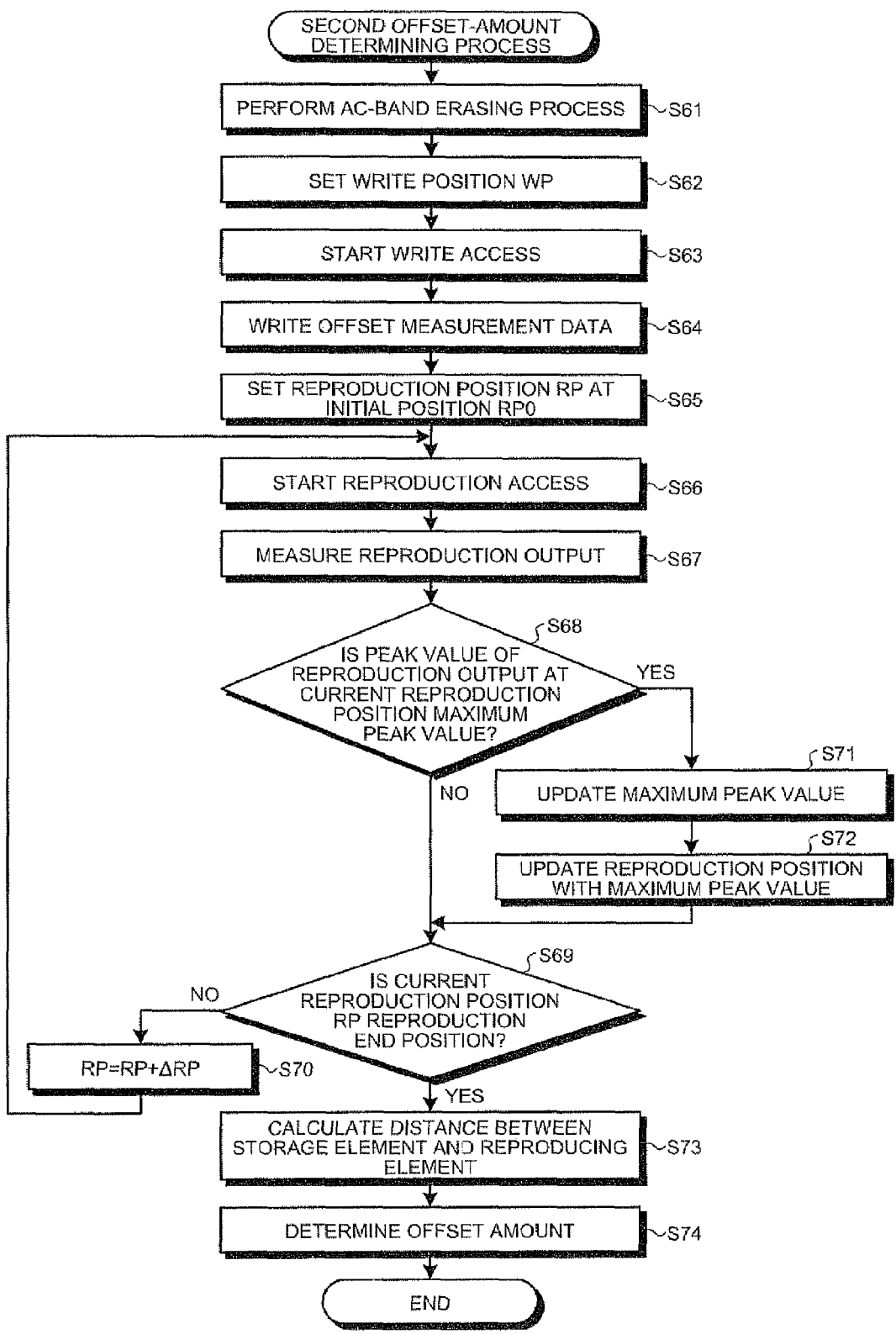
FIG. 11 is a flowchart of an operation of a control circuit involved in a second offset-amount determining process of the HDD device according to the second embodiment.

Next, the operation of the HDD device 1A according to the second embodiment is described. In the HDD device 1A, the DTM 3A with the traverse tracks 36 formed therein is mounted. FIG. 11 is a flowchart of the operation of the control circuit 8 involved in a second offset-amount determining process of the HDD device 1A according to the second embodiment.

The second offset-amount determining process depicted in FIG. 11 is a process for determining an offset amount between the storage element 4A and the reproducing element 4B of the magnetic head unit 4 that performs a write access and reproduction access to the DTM 3A.

In FIG. 11, when an offset-amount measurement start signal is detected, the write controlling unit 21A in the main controlling unit 15 moves the storage element 4A based on the servo patterns 32 in the offset-amount measurement area 35 to perform an AC-band erasing process for data magnetic erasing on the offset-amount measurement area 35 in which offset measurement data X is to be written, on the order of ±3 micrometers in the cross-track direction at a high frequency on the order of 1 GFluxChange/sec through the storage element 4A (step S61).

The write controlling unit 21A then sets a desired write position WP so as to write the offset measurement data X through the storage element 4A (step S62), and then starts a write access of the storage element 4A (step S63).

The write controlling unit 21A writes the offset measurement data X of a single frequency signal of 90 FluxChange/sec in the offset-amount measurement area 35 through the storage element 4A (step S64). Note that, as depicted in FIG. 8, when the write controlling unit 21A writes the offset measurement data X in the offset-amount measurement area 35 through the storage element 4A, since the traverse track 36 traverses adjacent tracks 33, the offset measurement data X is always written on the traverse track 36.

The reproduction controlling unit 22A in the main controlling unit 15 sets the reproduction position RP with respect to the write position WP as an initial position RP0 so as to reproduce the offset measurement data X in the traverse track 36 through the reproducing element 4B (step S65), starts a reproduction access of the reproducing element 4B (step S66), and measures a reproduction output (i.e., TAA) at the current reproduction position RP through the reproducing element 4B (step S67).

The reproduction controlling unit 22A then determines whether a peak value of the reproduction output at the current reproduction position RP is a maximum peak value (step S68).

When a peak value of the reproduction output at the current reproduction position RP is not a maximum peak value ("No" at step S68), the reproduction controlling unit 22A determines whether the current reproduction position RP is a reproduction end position (step S69). Note that the reproduction end position is a position immediately before leaving the reproducible range regarding the write position WP.

If the current reproduction position RP is not the reproduction end position ("No" at step S69), the reproduction controlling unit 22A shifts the current reproduction position RP by ΔRP (3 nanometers) and sets RP+ΔRP as a current reproduction position (step S70), and then goes to step S66 to start a reproduction access through the reproducing element 4B.

When the peak value at the current reproduction position RP is a maximum value ("Yes" at step S68), the reproduction controlling unit 22A updates and stores the peak value at the current reproduction position RP in the peak-value storage unit 23 as a maximum peak value for the write position WP (step S71).

Further, when the peak value at the current reproduction position RP is updated and stored in the peak-value storage unit 23 as a maximum peak value, the reproduction controlling unit 22A updates and stores a reproduction position RPMAX with the maximum peak value for the current write position WP (step S72), and then goes to step S69 so as to determine whether the current reproduction position RP is the reproduction end position.

Figure 12:
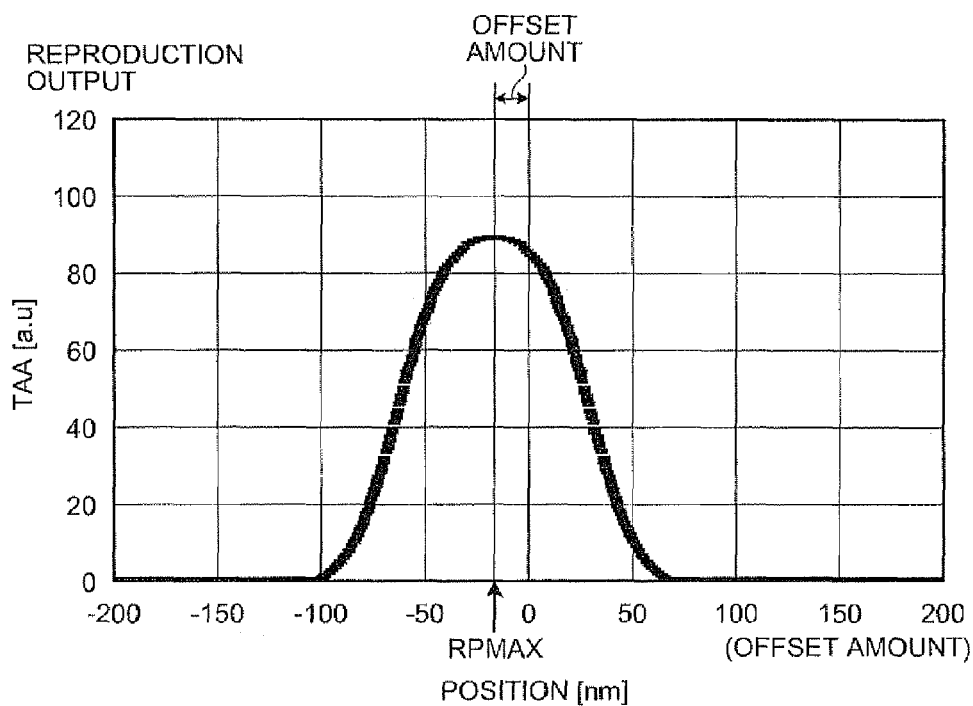
FIG. 12 is a schematic drawing for explaining a reproduction position (offset amount) and a reproduction output (TAA) of a reproducing element in the second offset-amount determining process of the HDD device according to the second embodiment.

That is, the reproduction output of the offset measurement data X written at the current write position WP is produced for each ΔRP from the initial position RP0 to the reproduction end position by shifting the reproducing element 4B, whereby the reproduction position RPMAX with the maximum peak value is obtained from among the offset measurement data X written at the current write position WP, as depicted in FIG. 12.

When the current reproduction position RP is the reproduction end position ("Yes" at step S69), the offset-amount determining unit 24 calculates a distance between the storage element 4A and the reproducing element 4B based on the reproduction position RPMAX and the write position WP corresponding to maximum peak value stored in the peak-value storage unit 23 (step S73), and determines an offset amount between the storage element 4A and the reproducing element 4B (step S74), thereby ending the operation of FIG. 11.

In the second offset-amount determining process depicted in FIG. 11, the offset measurement data X is written in track down direction at the write position WP in the offset-amount measurement area 35 on the DTM 3A. With this, even when the write position WP where the offset measurement data is to be written is not at the center of the data track 31, the offset measurement data is always written in the traverse track 36. Therefore, a reproduction is sequentially performed on the traverse track 36 by ΔRP from the reproduction position RP to the reproduction end position. Then, from among the plurality of reproduction positions RP for the write positions WP, the reproduction position RPMAX with the maximum peak value is specified, a distance between the storage element 4A and the reproducing element 4B is calculated based on the reproduction position RPMAX and the write position WP, and the calculated distance is determined as an offset amount between the storage element 4A and the reproducing element 4B. Therefore, even in the DTM 3A in which the guard band 34 is disposed between adjacent tracks 33, the offset amount between the storage element 4A and the reproducing element 4B can be easily determined.

Also, according to the second offset-amount determining process, since the traverse track 36 traverses adjacent tracks 33, the offset measurement data is always written in the traverse track 36. Therefore, the write position WP is not required to be sequentially shifted, and the processing time can be significantly reduced compared with the first offset-amount determining process depicted in FIGS. 5A and 5B.

In the HDD device 1A according to the second embodiment, the offset measurement data X is written in track down direction at the write position WP in the offset-amount measurement area 35 on the DTM 3A. With this, even when the write position WP where the offset measurement data X is to be written is not at the center of the data track 31, the offset measurement data is always written in the traverse track 36. Therefore, a reproduction is sequentially performed on the traverse track 36 by ΔRP from the reproduction position RP to the reproduction end position. Then, from among the plurality of reproduction positions RP for the write positions WP, the reproduction position RPMAX with the maximum peak value is specified, a distance between the storage element 4A and the reproducing element 4B is calculated based on the reproduction position RPMAX and the write position WP, and the calculated distance is determined as an offset amount between the storage element 4A and the reproducing element 4B. Therefore, even in the DTM 3A in which the guard band 34 is disposed between adjacent tracks 31, the offset amount between the storage element 4A and the reproducing element 4B can be easily determined, while significantly reducing the processing time.

In the offset-amount measurement area 35, which is a partial area of the DTM 3A of the HDD device 1A according to the second embodiment, as depicted in FIG. 8, the traverse tracks 36 traversing adjacent tracks 33 are disposed in a slanting direction. Alternatively, the configuration of the DTM 3A may be as explained below in a third embodiment.

[c] Third Embodiment

Figure 13:
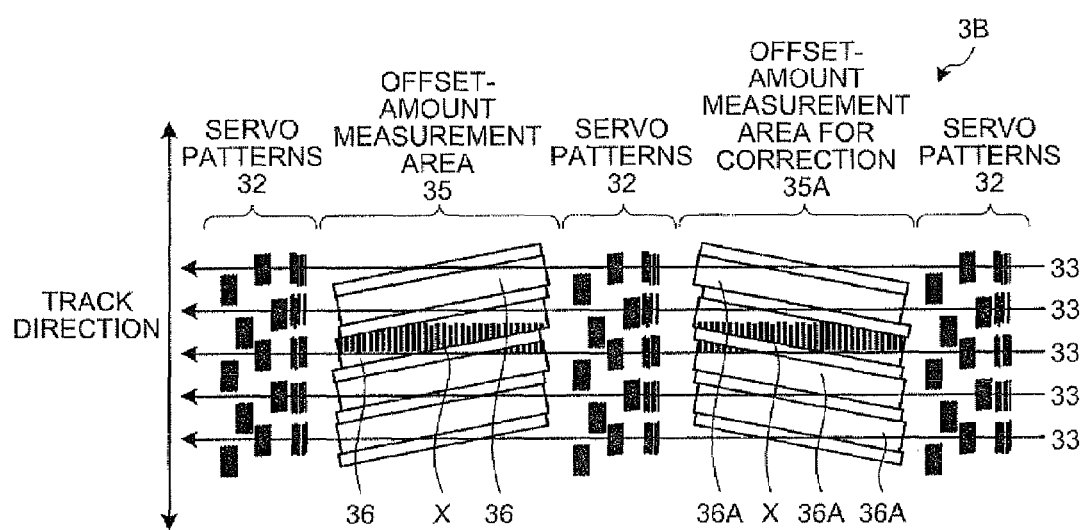
FIG. 13 is a schematic drawing for explaining a track arrangement in a partial area of a DTM mounted on an HDD device according to a third embodiment.
Figure 14:
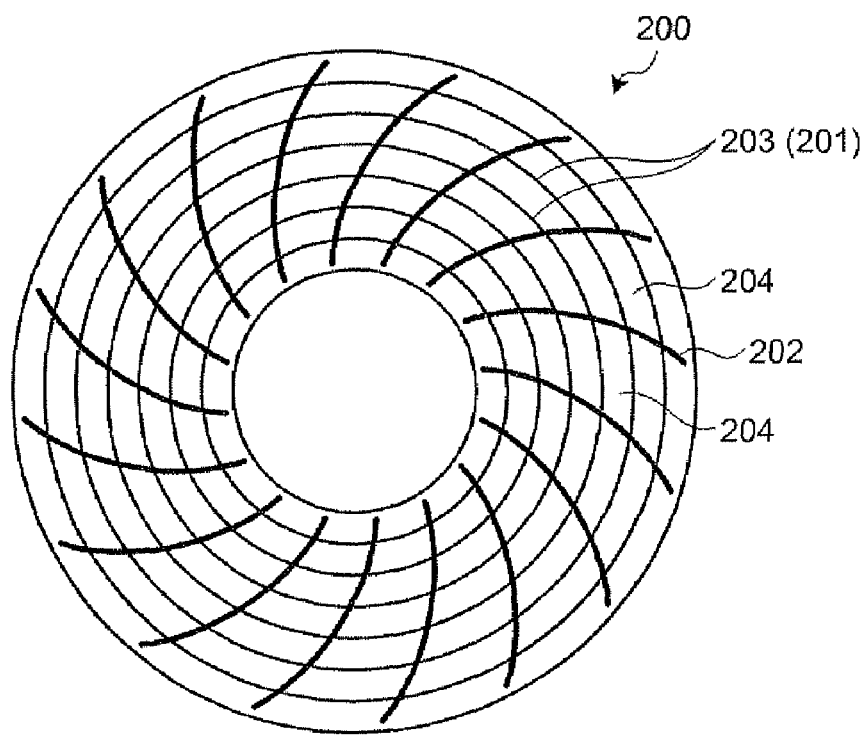
FIG. 14 is a schematic plan view briefly depicting the arrangement of data tracks and servo patterns in a general DTM.
Figure 15:
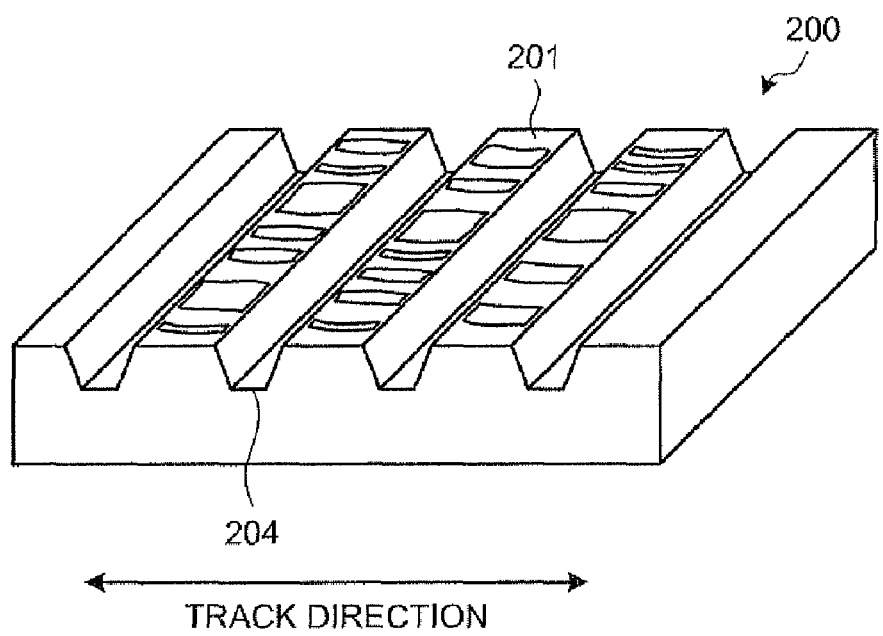
FIG. 15 is a schematic partial cutaway view depicting an arrangement of tracks and guard bands in a general DTM.
Figure 16:
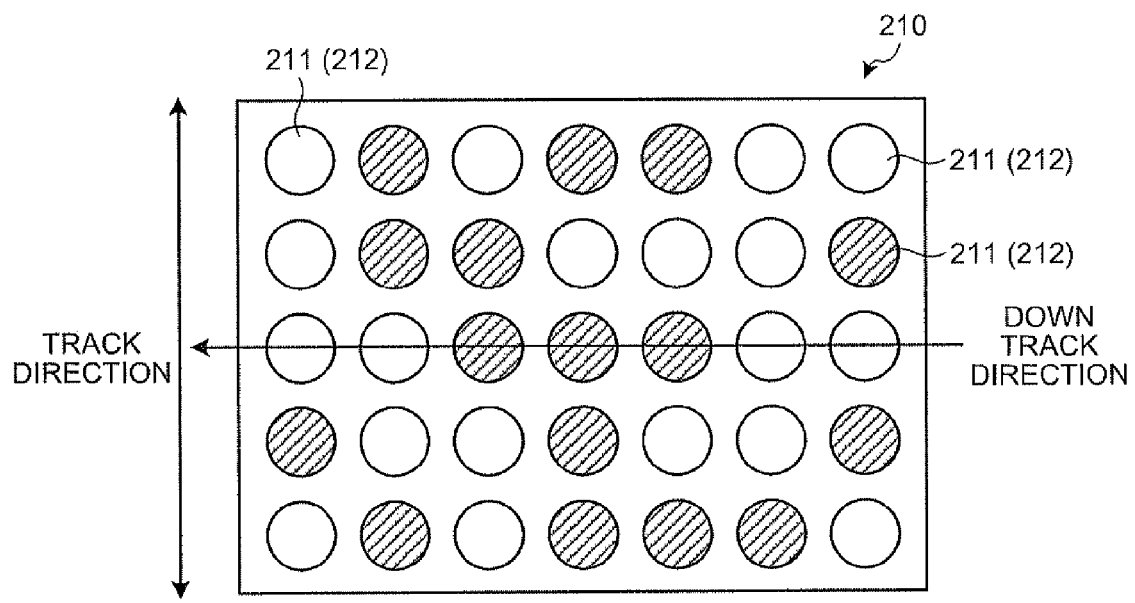
FIG. 16 is a schematic partial cutaway view depicting an arrangement of tracks and a guard band in a general BPM.

FIG. 13 is a schematic drawing for explaining a track arrangement of a partial area of a DTM mounted on an HDD device according to a third embodiment. Note that components in a partial area identical to those in the HDD device 1A according to the second embodiment are denoted by the same reference numerals, and the common configurations and operations are not explained herein.

In the partial area of a DTM 3B depicted in FIG. 13, in addition to the offset-amount measurement area 35 in which the traverse tracks 36 are disposed, an offset-amount measurement area for correction 35A in which a plurality of traverse tracks for correction 36A bilaterally symmetrical to the traverse tracks 36 are disposed between adjacent tracks 33 via each of the guard bands 34 so as to allow writing of the offset measurement data X at the center position of the storage element 4A.

Next, the operation of an HDD device 1B according to the third embodiment is explained.

First, when an offset-amount measurement start signal is detected, the write controlling unit 21A of the main controlling unit 15 writes the offset measurement data X in a part of the traverse track 36 in the offset-amount measurement area 35 through the storage element 4A and stores the write position WP of the storage element 4A as a first write position WP1 at step S61 through S64 in the second offset-amount determining process depicted in FIG. 11.

Upon writing the offset measurement data X in the part of the traverse track 36 as depicted in FIG. 13 at steps S65 through S72 in the second offset-amount determining process depicted in FIG. 11, the reproduction controlling unit 22A sequentially positions the center position of the reproducing element 4B through the servo controlling unit 12 at the reproduction position RP within the reproducible range regarding the first write position WP1 by ΔRP to produce a reproduction output.

Then, from among the peak values of the reproduction output at the respective reproduction positions in the traverse track 36, the offset-amount determining unit 24 specifies the reproduction position RPMAX corresponding to the maximum peak value as a first reproduction position RPMAX1 of the reproducing element 4B. Then, based on the first write position WP1 of the storage element 4A and the first reproduction position RP1 of the reproducing element 4B, a first offset amount is specified and stored as a moved distance between the storage element 4A and the reproducing element 4B.

Next, the write controlling unit 21A writes the offset measurement data X in a part of the traverse track for correction 36A in the offset-amount measurement area for correction 35A through the storage element 4A at steps S61 through S64 in the second offset-amount determining process depicted in FIG. 11 as depicted in FIG. 13, and stores the write position WP of the storage element 4A as a second write position WP2.

Furthermore, when the offset measurement data X is written in the part of the traverse track for correction 36A at steps S65 through S72 in the second offset-amount determining process depicted in FIG. 11, the reproduction controlling unit 22A sequentially positions the center position of the reproducing element 4B through the servo controlling unit 12 at the reproduction position RP within the reproducible range regarding the second write position WP2 by ΔRP to produce a reproduction output.

The offset-amount determining unit 24 specifies, from among the peak values of the TAA for each reproduction position RP in the traverse track for correction 36A, a reproduction position RPMAX corresponding to a maximum peak value as a second reproduction position RPMAX2 of the reproducing element 4B.

Then, based on the second write position WP2 of the storage element 4A and the second reproduction position RPMAX 2 of the reproducing element 4B, the offset-amount determining unit 24 specifies and stores a second offset amount as a moved distance between the storage element 4A and the reproducing element 4B.

Then, the offset-amount determining unit 24 determines an average value between the stored first offset amount specified in the traverse track 36 and the stored second offset amount specified in the traverse track for correction 36A as an offset amount between the storage element 4A and the reproducing element 4B.

According to the HDD device 1B of the third embodiment, an average value between the first offset amount specified in the traverse track 36 of the offset-amount measurement area 35 and the second offset amount specified in the traverse track for correction 36A of the offset-amount measurement area for correction 35A is taken as an offset amount between the storage element 4A and the reproducing element 4B of the magnetic head unit 4. Therefore, compared with the HDD device 1A according to the second embodiment, while correcting the positional shift amount at the time of forming data track patterns, measurement accuracy of the offset amount can be increased.

Further, in the first through third embodiments, the DTM 3 (3A, 3B) is explained as a magnetic storage medium. Alternatively, even in a BPM where fixed bits are formed in a down track direction, traverse tracks and traverse tracks for correction may be disposed between adjacent tracks in a track direction. Even in this case, it goes without saying that effects similar to those explained can be achieved.

In the foregoing, while the embodiments of the present invention have been explained, the scope of technical idea of the present invention is not restricted by these embodiments, and it goes without saying that various embodiments can be implemented as long as they do not deviate from the scope of the technical idea recited in the claims. Also, the effects described in the embodiments are not meant to be restrictive.

Also, it goes without saying that, among the processes explained in the embodiments, all or part of the processes explained as being automatically performed may be manually performed and, conversely, all or part of the processes explained as being manually performed may be automatically performed. In addition, the process procedure, the control procedure, specific names, and information including various data and parameters explained in the present embodiment can be changed as appropriate unless otherwise specified.

Furthermore, each component of each device are depicted conceptually and functionally, and is not necessarily physically configured as depicted. It goes without saying that the specific patterns of each device are never meant to be restricted to those depicted.

Still further, all or part of various process functions performed in each device can be achieved by a Central Processing Unit (CPU) (or a microcomputer, such as Micro Processing Unit (MPU) or Micro Controller Unit (MCU)) and a program analyzed and executed on that CPU (or microcomputer, such as MPU or MCU), or can be achieved as hardware with a wired logic.

According to the embodiments, to allow a write at the center position of the storage element for offset measurement data, a magnetic storage medium having a traverse track traversing adjacent tracks via a guard band is implemented. With this, in measuring an offset amount between the storage element and the reproducing element, even when the center position of the storage element is not located at the track center position, offset measurement data is always written in part of the traverse track. Thus, the reproduction position of the reproducing element where the peak value of reproduction output is maximum with respect to the write position of the storage element can be recognized. As a result, an effect can achieved such that the offset amount between the storage element and the reproducing element can be easily determined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A controlling device for a storage device, the controlling device comprising:
a rotation-drive controlling unit that drives a magnetic storage medium for rotation, the magnetic storage medium including tracks and guard bands magnetically separating adjacent tracks alternately and concentrically disposed, the tracks including a plurality of data tracks in which data can be written and from which data can be reproduced and servo patterns disposed between the data tracks and allowing reproduction of positional information of the data tracks, the magnetic storage medium including an offset-amount measurement area in which traverse tracks are formed so as to traverse adjacent tracks via each of the guard bands so that writing regarding offset measurement data for measuring an offset amount between a storage element and a reproducing element of a magnetic head unit is allowed at a center position of the storage element;

a magnetic-head-drive controlling unit that controls a movement of the magnetic head unit in a track direction with respect to the magnetic storage medium;

a write controlling unit that writes, when an offset-amount measurement start signal is detected, the offset measurement data in a part of a relevant one of the traverse tracks in the offset-amount measurement area through the storage element, and also stores a write position of the storage element in the track direction;

a reproduction controlling unit that sequentially positions, when the offset measurement data is written in the part of the traverse track in the offset-amount measurement area, a center position of the reproducing element of the magnetic head unit at a reproduction position in a reproducible range regarding the write position through the magnetic-head-drive controlling unit for each predetermined distance to produce a reproduction output; and an offset-amount determining unit that specifies, from among peak values of the reproduction output for each reproduction position, a reproduction position corresponding to a maximum peak value as a reproduction position of the reproducing element and, based on the write position of the storage element and the reproduction position of the reproducing element, determines an offset amount as a moved distance between the storage element and the reproducing element.

2. The controlling device according to claim 1, wherein the traverse tracks are disposed in the offset-amount measurement area so as to traverse the adjacent tracks via each of the guard bands in a slanting direction.

3. The controlling device according to claim 1, wherein in addition to the offset-amount measurement area, the magnetic storage medium has an offset-amount measurement area for correction in which traverse tracks for correction bilaterally symmetrical to the traverse tracks are formed so as to traverse adjacent tracks via each of the guard bands so that writing of the storage element regarding the offset measurement data is allowed at a center position, the write controlling unit writes the offset measurement data in a part of a relevant one of the traverse tracks in the offset-amount measurement area through the storage element and stores a write position of the storage element as a first write position, when the offset measurement data is written in the part of the traverse track, the reproduction controlling unit sequentially positions the center position of the reproducing element at a reproduction position in a reproducible range regarding the first write position through the magnetic-head-drive controlling unit for each predetermined distance to produce a reproduction output, from among peak values of the reproduction output for each reproduction position in the traverse track, the offset-amount determining unit specifies a reproduction position corresponding to a maximum peak value as a first reproduction position of the reproducing element and, based on the first write position of the storage element and the first reproduction position of the reproducing element, specifies a first offset amount as a moved distance between the storage element and the reproducing element, the write controlling unit writes the offset measurement data in a part of a relevant one of the traverse tracks for correction in the offset-amount measurement area for correction through the storage element and stores the write position of the storage element as a second write position, when the offset measurement data is written in the part of the traverse track for correction, the reproduction controlling unit sequentially positions the center position of the reproducing element at a reproduction position in a reproducible range regarding the second write position through the magnetic-head-drive controlling unit for each predetermined distance to produce a reproduction output, and from among peak values of the reproduction output for each reproduction position in the traverse track for correction, the offset-amount determining unit specifies a reproduction position corresponding to a maximum peak value as a second reproduction position of the reproducing element and, based on the second write position of the storage element and the second reproduction position of the reproducing element, specifies a second offset amount as a moved distance between the storage element and the reproducing element, and determines an average value between the first offset amount and the second offset amount as an offset amount between the storage element and the reproducing element.

4. A magnetic storage medium including tracks and guard bands magnetically separating adjacent tracks alternately and concentrically disposed, the tracks including a plurality of data tracks in which data can be written and from which data can be reproduced and servo patterns disposed between the data tracks and allowing reproduction of positional information of the data tracks, wherein an offset-amount measurement area is disposed in a partial area of the magnetic storage medium for use in measuring an offset amount between a storage element of a storage device and a reproducing element of the storage device, the storage element writing data in the magnetic storage medium and the reproducing element reproducing data written in the magnetic storage medium, and when the offset amount is measured, to ensure writing the offset measurement data at a center position of the storage element in the offset-amount measurement area, traverse tracks are disposed in the offset-amount measurement area, the traverse tracks traversing adjacent tracks via each of the guard bands and allowing writing and reproduction of the offset measurement data.

5. The magnetic storage medium according to claim 4, wherein
the traverse tracks are disposed in the offset-amount measurement area so as to traverse the adjacent tracks via each of the guard bands in a slanting direction.

6. The magnetic storage medium according to claim 4, wherein
in addition to the offset-amount measurement area, the magnetic storage medium has, in a partial area of the magnetic storage medium, an offset-amount measurement area for correction in which traverse tracks for correction bilaterally symmetrical to the traverse tracks are formed so as to traverse adjacent tracks via each of the guard bands so that writing of the storage element regarding the offset measurement data is allowed at a center position.

7. A storage device comprising:
a magnetic storage medium including tracks and guard bands magnetically separating adjacent tracks alternately and concentrically disposed, the tracks including a plurality of data tracks in which data can be written and from which data can be reproduced and servo patterns disposed between the data tracks and allowing reproduction of positional information of the data tracks, the magnetic storage medium including an offset-amount measurement area where traverse tracks are formed traversing adjacent tracks via each of the guard bands and allowing writing and reproduction of offset measurement data;
a magnetic head unit including a storage element that writes data in the magnetic storage medium and a reproducing element that reproduces data from the magnetic storage medium;
a rotation-drive controlling unit that drives the magnetic storage medium for rotation;
a magnetic-head-drive controlling unit that controls a movement of the magnetic head unit in a track direction;
a write controlling unit that writes, when an offset-amount measurement start signal is detected, the offset measurement data in a part of the traverse tracks in the offset-amount measurement area through the storage element, and also stores a write position of the storage element in the track direction;
a reproduction controlling unit that sequentially positions, when the offset measurement data is written in the part of the traverse track in the offset-amount measurement area, a center position of the reproducing element of the magnetic head unit at a reproduction position in a reproducible range regarding the write position through the magnetic-head-drive controlling unit for each predetermined distance to produce a reproduction output; and
an offset-amount determining unit that specifies, from among peak values of the reproduction output for each reproduction position, a reproduction position corresponding to a maximum peak value as a reproduction position of the reproducing element and, based on the write position of the storage element and the reproduction position of the reproducing element, determines an offset amount as a moved distance between the storage element and the reproducing element.

8. The storage device according to claim 7, wherein the traverse tracks are disposed in the offset-amount measurement area so as to traverse the adjacent tracks via each of the guard bands in a slanting direction.

9. The storage device according to claim 7, wherein
in addition to the offset-amount measurement area, the magnetic storage medium has an offset-amount measurement area for correction in which traverse tracks for correction bilaterally symmetrical to the traverse tracks are formed so as to traverse adjacent tracks via each of the guard bands so that writing of the storage element regarding the offset measurement data is allowed at a center position,
the write controlling unit writes the offset measurement data in a part of a relevant one of the traverse tracks in the offset-amount measurement area through the storage element and stores a write position of the storage element as a first write position,
when the offset measurement data is written in the part of the traverse track, the reproduction controlling unit sequentially positions the center position of the reproducing element at a reproduction position in a reproducible range regarding the first write position through the magnetic-head-drive controlling unit for each predetermined distance to produce a reproduction output,
from among peak values of the reproduction output for each reproduction position in the traverse track, the offset-amount determining unit specifies a reproduction position corresponding to a maximum peak value as a first reproduction position of the reproducing element and, based on the first write position of the storage element and the first reproduction position of the reproducing element, specifies a first offset amount as a moved distance between the storage element and the reproducing element,
the write controlling unit writes the offset measurement data in a part of a relevant one of the traverse tracks for correction in the offset-amount measurement area for correction through the storage element and stores the write position of the storage element as a second write position,
when the offset measurement data is written in the part of the traverse track for correction, the reproduction controlling unit sequentially positions the center position of the reproducing element at a reproduction position in a reproducible range regarding the second write position through the magnetic-head-drive controlling unit for each predetermined distance to produce a reproduction output, and
from among peak values of the reproduction output for each reproduction position in the traverse track for correction, the offset-amount determining unit specifies a reproduction position corresponding to a maximum peak value as a second reproduction position of the reproducing element and, based on the second write position of the storage element and the second reproduction position of the reproducing element, specifies a second offset amount as a moved distance between the storage element and the reproducing element, and determines an average value between the first offset amount and the second offset amount as an offset amount between the storage element and the reproducing element.

10. A method for determining an offset amount of a storage device, the method comprising:
driving a magnetic storage medium for rotation, the magnetic storage medium including tracks and guard bands magnetically separating adjacent tracks alternately and concentrically disposed, the tracks including a plurality of data tracks in which data can be written and from which data can be reproduced and servo patterns disposed between the data tracks and allowing reproduction of positional information of the data tracks, the magnetic storage medium including an offset-amount measurement area in which traverse tracks are formed so as to traverse adjacent tracks via each of the guard bands so that writing regarding offset measurement data for measuring an offset amount between a storage element and a reproducing element of a magnetic head unit is allowed at a center position of the storage element;
controlling a movement of the magnetic head unit in a track direction with respect to the magnetic storage medium;

writing, when an offset-amount measurement start signal is detected, the offset measurement data in a part of a relevant one of the traverse tracks in the offset-amount measurement area through the storage element, and also storing a write position of the storage element in the track direction;

sequentially positioning, when the offset measurement data is written in the part of the traverse track in the offset-amount measurement area, a center position of the reproducing element of the magnetic head unit at a reproduction position in a reproducible range regarding the write position through the controlling for each predetermined distance to produce a reproduction output; and specifying, from among peak values of the reproduction output for each reproduction position, a reproduction position corresponding to a maximum peak value as a reproduction position of the reproducing element and, based on the write position of the storage element and the reproduction position of the reproducing element, determining an offset amount as a moved distance between the storage element and the reproducing element.

11. The method according to claim 10, wherein the traverse tracks are disposed in the offset-amount measurement area so as to traverse the adjacent tracks via each of the guard bands in a slanting direction.

12. The method according to claim 10, wherein in addition to the offset-amount measurement area, the magnetic storage medium has an offset-amount measurement area for correction in which traverse tracks for correction bilaterally symmetrical to the traverse tracks are formed so as to traverse adjacent tracks via each of the guard bands so that writing of the storage element regarding the offset measurement data is allowed at a center position, the writing includes writing the offset measurement data in a part of a relevant one of the traverse tracks in the offset-amount measurement area through the storage element and storing a write position of the storage element as a first write position, the sequentially positioning includes, when the offset measurement data is written in the part of the traverse track, sequentially positioning the center position of the reproducing element at a reproduction position in a reproducible range regarding the first write position through the controlling for each predetermined distance to produce a reproduction output, the specifying includes specifying, from among peak values of the reproduction output for each reproduction position in the traverse track, a reproduction position corresponding to a maximum peak value as a first reproduction position of the reproducing element and, based on the first write position of the storage element and the first reproduction position of the reproducing element, specifies a first offset amount as a moved distance between the storage element and the reproducing element, and further, the writing includes writing the offset measurement data in a part of a relevant one of the traverse tracks for correction in the offset-amount measurement area for correction through the storage element and storing the write position of the storage element as a second write position, the sequentially positioning includes, when the offset measurement data is written in the part of the traverse track for correction, sequentially positioning the center position of the reproducing element at a reproduction position in a reproducible range regarding the second write position through the magnetic-head-drive controlling unit for each predetermined distance to produce a reproduction output, and the specifying includes specifying, from among peak values of the reproduction output for each reproduction position in the traverse track for correction, a reproduction position corresponding to a maximum peak value as a second reproduction position of the reproducing element and, based on the second write position of the storage element and the second reproduction position of the reproducing element, specifies a second offset amount as a moved distance between the storage element and the reproducing element, and determines an average value between the first offset amount and the second offset amount as an offset amount between the storage element and the reproducing element.

* * * * *